United States Patent
Likhacheva

(10) Patent No.: US 12,515,073 B2
(45) Date of Patent: Jan. 6, 2026

(54) COLLAPSIBLE AND CURVED RADIATION THERAPY SYSTEM AND METHODS

(71) Applicant: Anna O. Likhacheva, Davis, CA (US)

(72) Inventor: Anna O. Likhacheva, Davis, CA (US)

(73) Assignee: Geometry Therapeutics, Inc., Davis, CA (US)

( * ) Notice: Subject to any disclaimer, the term of this patent is extended or adjusted under 35 U.S.C. 154(b) by 36 days.

(21) Appl. No.: 17/403,394

(22) Filed: Aug. 16, 2021

(65) Prior Publication Data

US 2022/0047891 A1     Feb. 17, 2022

Related U.S. Application Data

(60) Provisional application No. 63/066,789, filed on Aug. 17, 2020.

(51) Int. Cl.
*A61N 5/10* (2006.01)

(52) U.S. Cl.
CPC .... *A61N 5/1002* (2013.01); *A61N 2005/1004* (2013.01)

(58) Field of Classification Search
CPC ...... A61N 5/10; A61N 5/1014; A61N 5/1015; A61N 5/1016; A61N 2005/1002; A61N 2005/1003; A61N 2005/1004; A61N 2005/1005; A61N 2005/1008; A61N 2005/1018; A61N 2005/1025
See application file for complete search history.

(56) References Cited

U.S. PATENT DOCUMENTS

| | | | |
|---|---|---|---|
| 4,947,842 A | | 8/1990 | Marchosky et al. |
| 5,484,384 A | * | 1/1996 | Fearnot ............... A61N 5/1002 600/3 |
| 5,800,394 A | | 9/1998 | Yoon et al. |
| 6,149,574 A | * | 11/2000 | Trauthen ............. A61N 5/1002 600/3 |
| 7,658,725 B2 | | 2/2010 | Bialecki et al. |

(Continued)

FOREIGN PATENT DOCUMENTS

EP     0719571 A2     7/1996

OTHER PUBLICATIONS

International Search Report & Written Opinion dated Feb. 11, 2021 in Int'l PCT Patent Appl. Serial No. PCT/US2020/060768 (0210).

(Continued)

*Primary Examiner* — Samuel G Gilbert
(74) *Attorney, Agent, or Firm* — Resonance IP Law, PC

(57) ABSTRACT

Systems and methods for minimally invasively delivering radiation therapy to a patient, e.g., with bladder cancer, is provided. The radiotherapy system includes one or more catheters that may be introduced to a patient's anatomical structure via a sheath using an intracavitary approach. The proximal end of the one or more catheters may be coupled to an afterloader for selectively delivering the radiation therapy, and the distal portion of the one or more catheters is transitionable between an uncoiled delivery state within the sheath and a coiled deployed state having a spherical configuration within the anatomical structure of the patient, such that the one or more catheters contacts at least a portion of the anatomical structure in the deployed state.

19 Claims, 14 Drawing Sheets

(56) References Cited

U.S. PATENT DOCUMENTS

| | | | |
|---|---|---|---|
| 7,785,301 B2 | 8/2010 | Yuzhakov | |
| 8,414,548 B2 | 4/2013 | Yuzhakov | |
| 2004/0243200 A1 | 12/2004 | Turner et al. | |
| 2005/0124843 A1* | 6/2005 | Singh | A61N 5/1014 600/3 |
| 2005/0251235 A1 | 11/2005 | Schlorff et al. | |
| 2006/0020156 A1* | 1/2006 | Shukla | A61N 5/1014 600/3 |
| 2006/0100475 A1* | 5/2006 | White | A61N 5/1015 600/7 |
| 2006/0189844 A1* | 8/2006 | Tien | A61B 1/01 600/146 |
| 2007/0270627 A1* | 11/2007 | Cutrer | A61N 5/1015 600/7 |
| 2009/0198095 A1* | 8/2009 | Acosta | A61M 25/1036 600/3 |
| 2011/0230700 A1* | 9/2011 | Sing | A61N 5/1015 600/7 |
| 2016/0361194 A1 | 12/2016 | Hautvast et al. | |
| 2021/0146106 A1 | 5/2021 | Likhacheva | |

OTHER PUBLICATIONS

Pieters, et al., GEC-ESTRO/ACROP Recommendations for Performing Bladder-Sparing Treatment With Brachytherapy for Muscle-Invasive Bladder Carcinoma, Radiotherapy and Oncology, 122(3):340-346 (2017).

Rzhevsky, et al., Microneedles as the technique of drug delivery enhancement in diverse organs and tissues, Journal of Controlled Release, 270:184-202 (2018).

Szunerits, et al., Heat: A Highly Efficient Skin Enhancer for Transdermal Drug Delivery, Frontiers in Bioengineering and Biotechnology, 6:1-13, Article 15 (2018).

International Search Report & Written Opinion dated Dec. 9, 2021 in Int'l PCT Patent Appl. Serial No. PCT/US2021/046141 (0310).

U.S. Appl. No. 17/099,443, filed Nov. 16, 2020.

* cited by examiner

COLLAPSIBLE AND CURVED RADIATION THERAPY SYSTEM AND METHODS

CROSS-REFERENCE TO RELATED APPLICATIONS

This application claims priority to U.S. Provisional Patent Application Ser. No. 63/066,789, filed Aug. 17, 2020, the entire contents of which are incorporated herein by reference.

FIELD OF USE

This application generally relates to systems and methods for improving application of radiation therapy to treat muscle invasive bladder cancer (MIBC) using a collapsible and curved device.

BACKGROUND

The standard treatment for bladder cancer, e.g., muscle-invasive bladder cancer (MIBC) is a radical cystectomy with pelvic lymph node dissection with or without neoadjuvant chemotherapy. Flexible catheters that may be implanted in the bladder wall are used to perform brachytherapy. Brachytherapy is a type of radiotherapy during which radioactive sources are placed inside or near target tissues.

Brachytherapy can be used with the aim of curing the cancer in cases of small or locally advanced tumors. The thin nature of the bladder wall lends itself to a non-invasive surface application of brachytherapy. As the radiation sources can be precisely positioned at the tumor treatment site, brachytherapy enables a high dose of radiation to be applied to a small area, e.g., the tumor, while sparing surrounding healthy tissue.

The radiation sources used for high dose rate brachytherapy are typically delivered through a technique known as afterloading, which involves the accurate positioning of non-radioactive applicators in the treatment site, which are subsequently loaded with the radiation sources. Remote afterloading systems provide protection from radiation exposure to healthcare professionals by securing the radiation source in a shielded safe. For example, a remote afterloader may include a small, sealed, 10 Curie $^{192}$Ir stepping source, mounted at the end of a stainless steel drive wire.

Prior to delivering the applicators to the treatment site within the patient, MRI-based planning may be used to determine the target treatment site. Once the applicators are correctly positioned in the patient, they are connected to an afterloader machine (containing the radioactive sources) through a series of flexible connecting guide tubes. The radioactive sources are delivered from the afterloader into the pre-specified positioned within the applicator. The radioactive sources remain in place for a pre-specified length of time, again following the treatment plan, following which they are returned along the tubes to the afterloader. Since the introduction of afterloading catheters, the majority of described toxicity has been observed to be transient local ulceration at the implant site.

Brachytherapy for bladder cancer is currently delivered using an interstitial, e.g., through the tissue, application using needles or catheters, and thus invasive. For example, the brachytherapy catheters may be implanted either by the open retropubic approach or the endoscopic surgical approach as described in "GEC-ESTRO/ACROP recommendations for performing bladder-sparing treatment with brachytherapy for muscle-invasive bladder carcinoma" by Bradley R. Pieters, et al. Complications with current treatment techniques include urinary tract infection, wound dehiscence, postoperative ileus, hydronephrosis due to obstruction at the distal urethra, bladder bleeding, and pulmonary embolism. Additionally, acute side effects associated with brachytherapy include localized bruising, swelling, bleeding, discharge or discomfort within the implanted region. Moreover, current applicators and methods are insufficient to treat patients with bladder cancer as the tumors may be hard to target within the bladder.

In view of the foregoing, it would be desirable to provide less invasive systems and methods to more efficiently target tumor cells within the bladder.

SUMMARY

Provided herein are radiation therapy systems and methods to treat a patient. For example, the radiation therapy system includes a sheath having a proximal end, a distal end, and one or more lumens extending there between, and one or more catheters, e.g., one, two, or four catheters, independently moveable within the one or more lumens of the sheath. The one or more catheters have a distal portion that is transitionable from an uncoiled delivery state to a coiled deployed state having a spherical shape within an anatomical structure of the patient, e.g., the bladder. Moreover, the one or more catheters may selectively deliver radiation therapy to a target area within the anatomical structure in the coiled deployed state. For example, each of the one or more catheters may be individually activated to deliver radiation.

The distal portion of the one or more catheters may be flexible and/or made of a shape memory material. Accordingly, the distal portion of the one or more catheters is transitionable from the uncoiled delivery state to the coiled deployed state when exposed beyond the distal end of the sheath. For example, each of the one or more catheters extends from a proximal end of the distal portion, curves about a longitudinal axis of the distal portion while a radial distance between the one or more catheters and the longitudinal axis increases until reaching a midpoint of the distal portion, extends from the midpoint of the distal portion, and curves about the longitudinal axis of the distal portion while the radial distance between the one or more catheters and the longitudinal axis decreases until reaching a distal end of the distal portion. Accordingly, in the coiled deployed state, at least a portion of the one or more catheters contacts an inner wall of the patient's bladder. In some embodiments, in the coiled deployed state, a proximal end of the spherical shape of the distal portion of the one or more catheters may be at a preselected angle from a longitudinal axis of the sheath.

Moreover, in the coiled deployed state, each curved portion of the distal portion of the one or more catheters may be at most 0.5 cm from an adjacent curved portion of the distal portion of the one or more catheters. Each of the one or more catheters may be coupled to each other at a distal end of the distal portion. Alternatively, or additionally, at least one of the one or more catheters includes a hyperthermia delivery catheter such that the distal portion of the at least one of the one or more catheters may apply heat while simultaneously delivering radiation.

In accordance with one aspect of the present disclosure, a method of delivering radiation therapy system to treat a patient is provided. For example, the method includes positioning the distal end of the sheath within the anatomical structure of a patient; inserting one or more catheters in the uncoiled delivery state within one or more lumens of the sheath until the distal portion of the one or more catheters is positioned adjacent the distal end of the sheath within the anatomical structure of the patient; moving the sheath relative to the one or more catheters until the distal portion of the one or more catheters is exposed beyond the distal end of the sheath and transitions to the coiled deployed state having a spherical shape within the anatomical structure of the patient; and selectively delivering radiation therapy via the distal portion of the one or more catheters to the target area within the anatomical structure in the coiled deployed state. For example, the one or more catheters may be individually activated to deliver radiation. Moreover, the method may include applying via at least one of the one or more catheters heat while simultaneously delivering radiation.

In addition, after completion of the radiation therapy, the method further may include moving the sheath relative to the one or more catheters until the distal portion of the one or more catheters transitions from the coiled deployed state within the anatomical structure of the patient to the uncoiled delivery state within the one or more lumens of the sheath; and removing the sheath and the one or more catheters from the patient.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In view of the foregoing, it would be desirable to provide less invasive systems and methods for delivering radiation therapy to a patient, e.g., with bladder cancer. For example, the brachytherapy applicator may be introduced via an intracavitary application such that the brachytherapy applicator is placed inside an organ through a natural opening. In addition, the applicator may include expandable catheters such that the catheters of the applicator cover a larger area within the bladder, thereby allowing more accurate and effective targeting of the tumor cells at any location within the patient's bladder.

Figure 1:
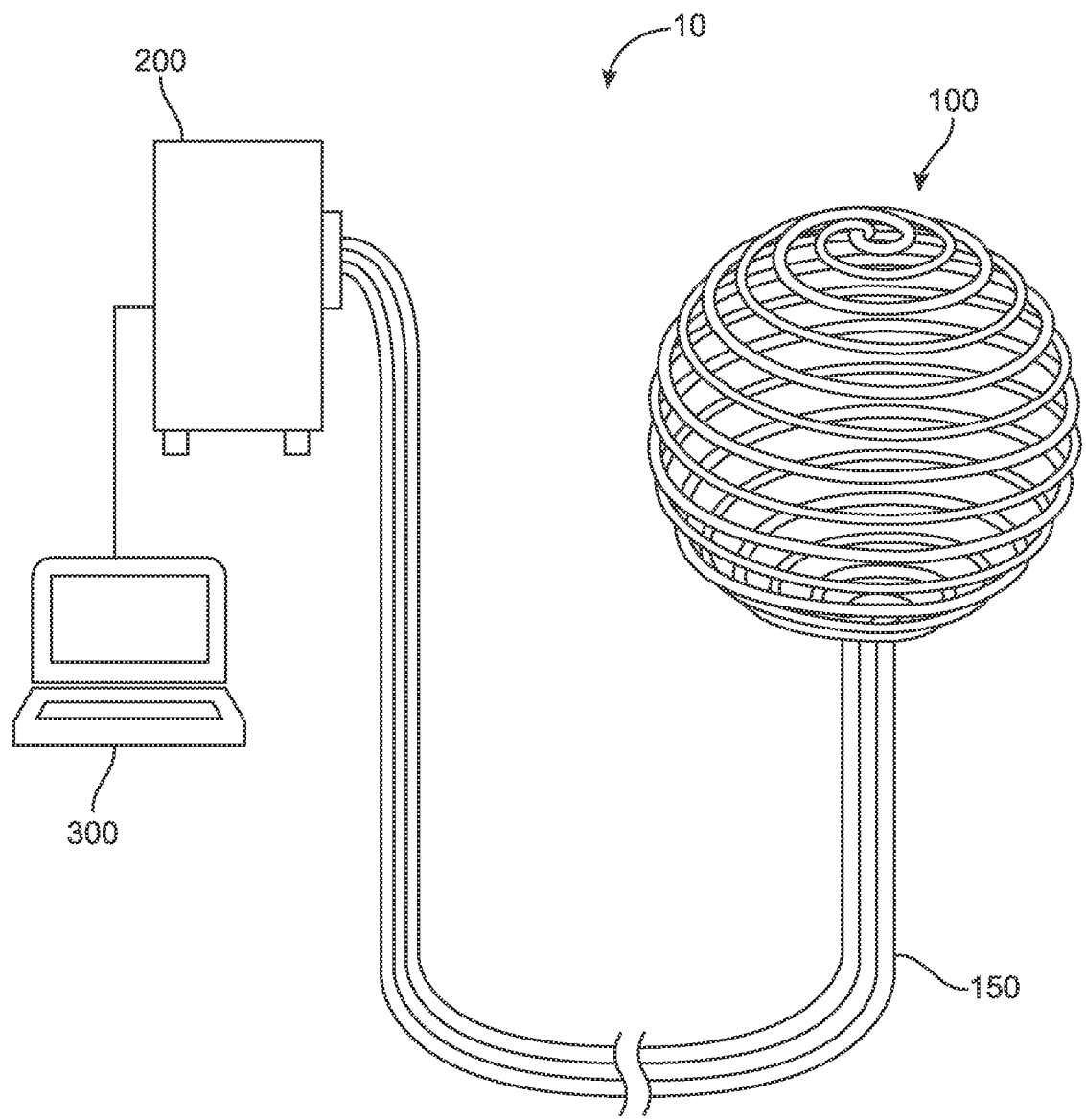
FIG. 1 is a schematic of an exemplary radiation therapy system constructed in accordance with the principles of the present disclosure.

Referring now to FIG. 1, radiation therapy system 10 for delivering non-invasive brachytherapy to a patient is provided. As illustrated in FIG. 1, system 10 includes applicator 100, which includes one or more catheters coupled to afterloader 200 via sheath 150, and computing device 300. Computing device 300 may be a standalone computing device, or may be incorporated into afterloader 200. Computing device 300 may communicate with afterloader 200 via any well-known wired or wireless connection (BluTooth, Wi-Fi Direct, etc.). Sheath 150 is coupled to afterloader 200 at its proximal end. The distal end of sheath 150 is sized and shaped to be non-invasively introduced to within a patient's organ via an intracavitary approach, e.g., via the patient's urethra. When the distal end of sheath 150 is in the proper position adjacent the treatment site within the patient's bladder, the one or more catheters may be exposed beyond the distal end of sheath 150 such that the one or more catheters may transition from a collapsed, uncoiled delivery state within sheath 150 to an expanded, coiled deployed state within the patient's organ.

Accordingly, the one or more catheters are formed of a flexible, shape-memory material, and are moveably disposed within a lumen of sheath 150. The one or more catheters are hollow structures having a proximal end which is coupled to afterloader 200, and a distal region sized and shaped to be disposed within the target anatomical structure. In the coiled deployed state, the distal region of the one or more catheters may have a shape that conforms to the target anatomical structure, e.g., the patient's bladder. For example, the one or more catheters may have a spherical configuration in the coiled deployed state. In addition, the one or more catheters have a lumen extending from its proximal end to its distal region such that afterloader 200 may deliver radioactive sources to the treatment site within the anatomical structure via the lumen of the one or more catheters.

As illustrated in FIG. 1, the distal region of the one or more catheters may have a spiral configuration, forming the spherical shape of the one or more catheters. As the one or more catheters are expandable within the patient's bladder such that at least some portion of the one or more catheters are adjacent to every part of the bladder, the target tumor cells will be adjacent to at least some portion of the one or more catheters, and the distal end of sheath 150 need not be positioned directly adjacent to the treatment site upon delivery. In other words, the one or more catheters may expand to cover a large surface area of the inner surface of the bladder, such that afterloader 100 may deliver radioactive sources along the one or more catheters to be adjacent tumor cells essentially anywhere within the bladder. In accordance with the principles of the present disclosure, the one or more catheters may be formed by a single catheter, or multiple catheters, e.g., 2 or 4 applicators, as described in further detail below. FIG. 1 illustrates applicator 100 formed of two catheters.

Figure 2A:
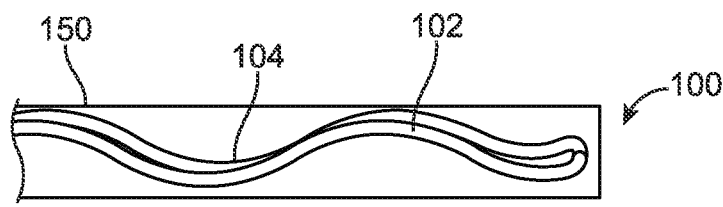
FIG. 2A is a side view of an exemplary applicator having two catheters in a uncoiled delivery state within a sheath.
Figure 2B:
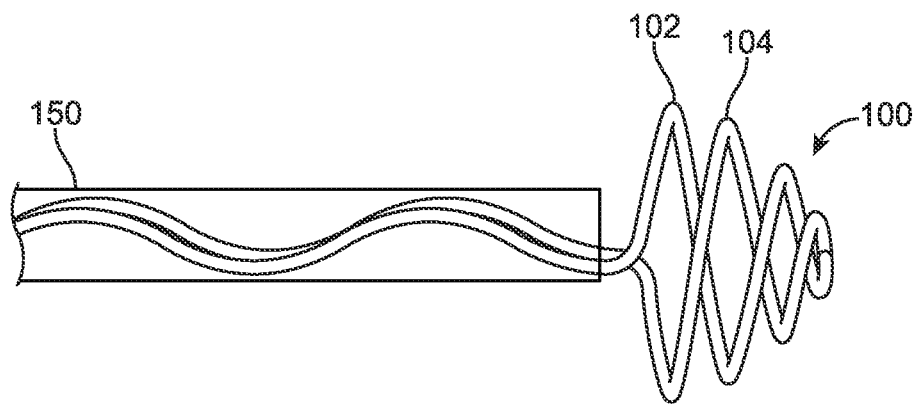
FIG. 2B is a side view of the applicator of FIG. 2A with the catheters partially exposed from the sheath.
Figure 2C:
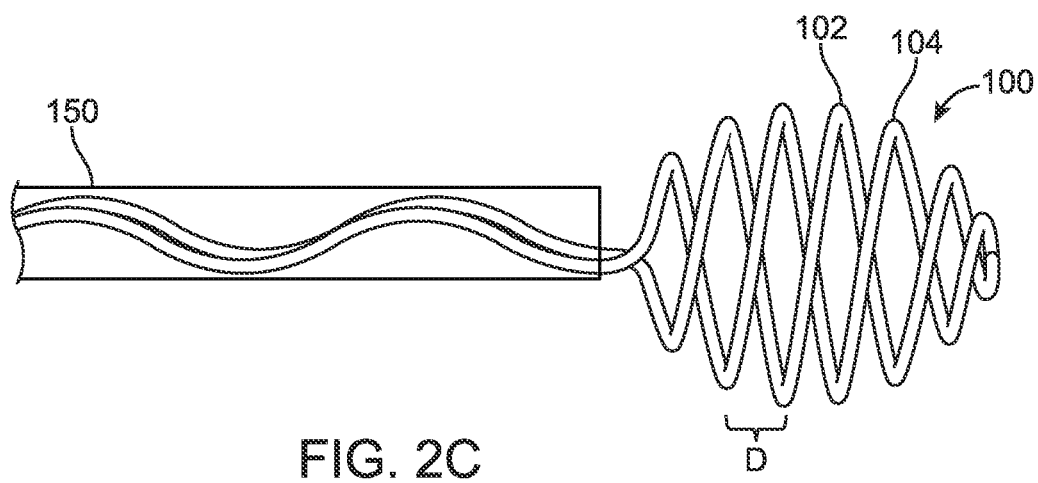
FIG. 2C is a side view of the applicator of FIG. 2B with the catheters in an expanded delivery state.

Referring now to FIG. 2A-2C, applicator 100 having two independently controllable catheters 102, 104 is provided. Each of catheters 102, 104 may be individually activated by afterloader 200 to deliver radiation. As shown in FIG. 2A, catheters 102, 104 may be positioned within the lumen of sheath 150 in a collapsed state. In accordance with another aspect of the present disclosure, each of catheters 102, 104 may be positioned within their own respective lumen within sheath 150. Accordingly, the distal end of sheath 150, having the distal regions of catheters 102, 104 disposed therein, may be inserted through the patient's urethra and into the patient's bladder.

As illustrated in FIG. 2B, as catheters 102, 104 move relative to sheath 150 such that the distal portions of catheters 102, 104 are exposed beyond the distal end of sheath 150, catheters 102, 104 transition from the uncoiled delivery state to the coiled deployed state within the patient's bladder. Accordingly, sheath 150 may be retracted relative to catheters 102, 104, and/or catheters 102, 104 may be pushed through the lumen of sheath 150 to expose catheters 102, 104 beyond the distal end of sheath 150. Moreover, catheters 102, 104 may expand to conform to the shape of the anatomical structure.

As catheters 102, 104 transition from the uncoiled delivery state to the coiled deployed state, the distal regions of catheters 102, 104 expand to a spiral, spherical shape. For example, catheters 102, 104 may have a spiral configuration such that each curved portion of the distal region of catheter 102 is positioned between two curved portions of the distal region of catheter 104, and vice versa. Specifically, as each of catheters 102, 104 extends from the distal end of sheath 150, the catheters curve about a longitudinal axis of the distal region of applicator 100 while a radial distance between catheters 102, 104 and the longitudinal axis increases until reaching a midpoint of the distal region of applicator 100, e.g., the portion of spherical configuration having the largest diameter. The catheters extend from the midpoint of the distal region and continue to curve about the longitudinal axis of applicator 100 while the radial distance between catheters 102, 104 and the longitudinal axis decreases until reaching a distal end of the distal region of applicator 100. In accordance with one aspect of the present disclosure, the distal ends of the distal portions of catheters 102, 104 may be fixed together to facilitate stability of applicator 100 during the transition between the uncoiled delivery state and the coiled deployed state.

FIG. 2C illustrates the distal region of applicator 100 in its full expanded spherical configuration, wherein each of the curved portions of the distal regions of catheters 102, 104 may contact a portion of the patient's bladder. Each of the curved portions of the distal regions of catheters 102, 104 are spaced apart from the adjacent curved portion of the distal regions of catheters 102, 104 by distance D, e.g., 0.4 to 0.6 cm, preferably 0.5 cm. Thus, as the curved portions of the distal regions of catheters 102, 104 alternate from the proximal end of the distal regions of catheter 102, 104 to the distal end of the distal region of catheters 102, 104, adjacent curved portions of catheter 102 will be at least 0.8-1.2 cm apart, preferably 1 cm apart, and adjacent curved portions of catheter 104 will be at least 0.8-1.2 cm apart, preferably 1 cm apart. Moreover, afterloader 200 may deliver a first radioactive source within catheter 102 and a second radioactive source within catheter 104 such that the first and second radioactive sources will be at least distance D apart from each other at all times during operation of applicator 100 for effective radiotherapy of the treatment site.

As the curved portions of the distal regions of catheters 102, 104 may contact various parts of the patient's bladder when applicator 100 is positioned within the bladder in the coiled deployed state, afterloader 200 may deliver one or more radioactive sources to various positions along the distal regions of catheters 102, 104, respectively, to be adjacent to essentially any part of the bladder. For example, afterload 200 delivers radiation to a large volume/surface by changing the location of the radioactive source and delivering the radiation for a predetermined "dwell time." One radiation source may be delivered to a position along the distal region of catheter 102, and another radiation source may be delivered to a position along the distal region of catheter 104. Thus, system 10 will be able to administer effective radiotherapy to target tumor cells anywhere in the bladder without having to specifically position applicator 100 adjacent to the target tumor cells prior to operation of system 10.

Figure 3A:
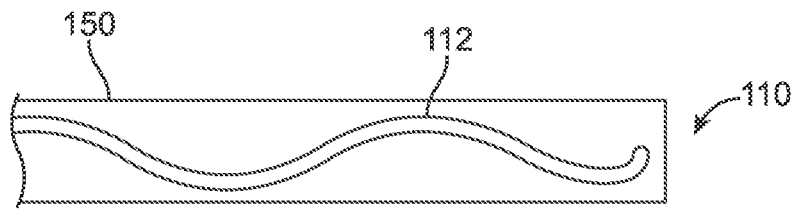
FIG. 3A is a side view of an alternative exemplary applicator having a catheter in a uncoiled delivery state within a sheath.
Figure 3B:
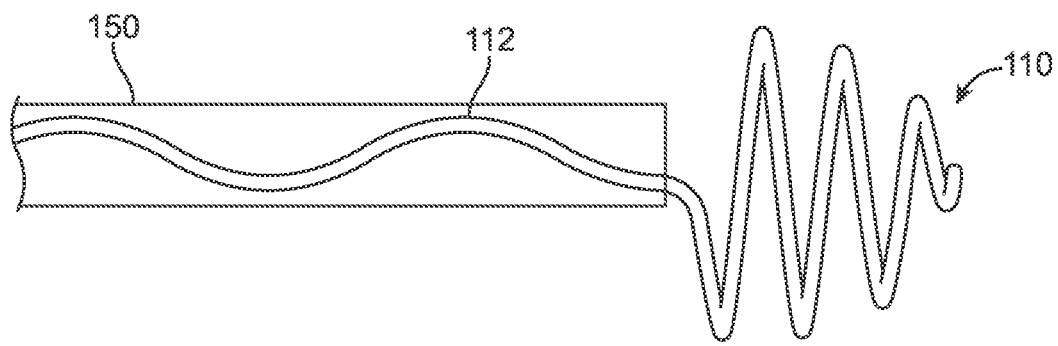
FIG. 3B is a side view of the applicator of FIG. 3A with the catheter partially exposed from the sheath.
Figure 3C:
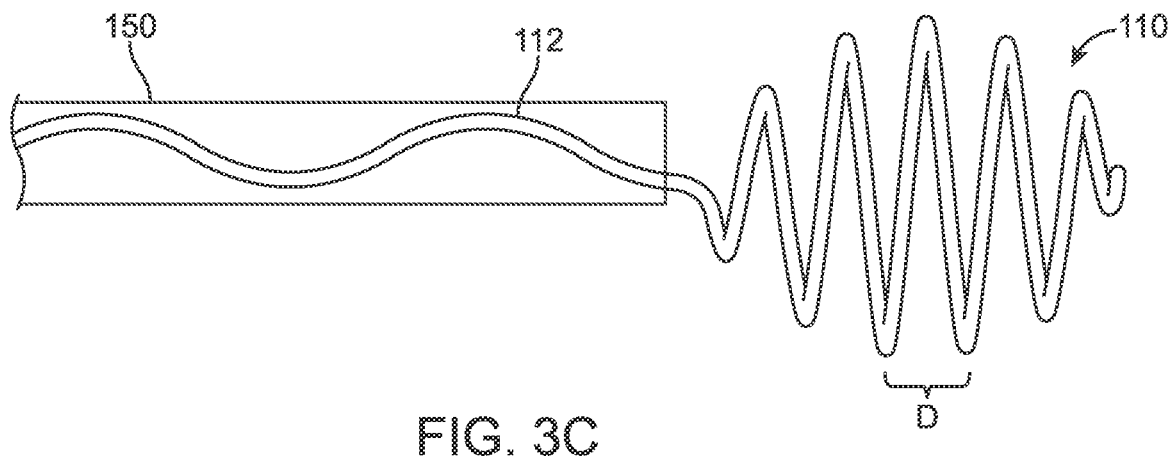
FIG. 3C is a side view of the applicator of FIG. 3B with the catheter in an expanded delivery state.

Referring now to FIGS. 3A-3C, an alternative exemplary applicator is provided. Applicator 110 is constructed similar to applicator 100 of FIGS. 2A-2C except that applicator 100 includes a single catheter 112. Thus, catheter 112 may be activated by afterloader 200 to deliver radiation to the treatment site. As shown in FIG. 3A, catheter 112 may be positioned within the lumen of sheath 150 in a collapsed state. Accordingly, the distal end of sheath 150, having the distal region of catheter 112 disposed therein, may be inserted through the patient's urethra and into the patient's bladder.

As illustrated in FIG. 3B, as catheter 112 moves relative to sheath 150 such that the distal portion of catheter 112 is exposed beyond the distal end of sheath 150, catheter 112 transitions from the uncoiled delivery state to the coiled deployed state within the patient's bladder. Moreover, catheter 112 may expand to conform to the shape of the anatomical structure.

Like catheters 102, 104, catheter 112 is transitionable from a collapsed, uncoiled delivery state to an expanded, coiled deployed state, such that the distal region of catheter 112 expands to a spiral, spherical shape. Specifically, as catheter 112 extends from the distal end of sheath 150, catheter 112 curves about a longitudinal axis of the distal region of applicator 110 while a radial distance between catheter 112 and the longitudinal axis increases until reaching a midpoint of the distal region of applicator 110, e.g., the portion of spherical configuration having the largest diameter. Catheter 112 extends from the midpoint of the distal region and continues to curve about the longitudinal axis of applicator 110 while the radial distance between catheter 112 and the longitudinal axis decreases until reaching a distal end of the distal region of applicator 110.

FIG. 3C illustrates the distal region of applicator 110 in its full expanded spherical configuration, wherein each of the curved portions of the distal region of catheter 112 may contact a portion of the patient's bladder. Each of the curved portions of the distal region of catheter 112 are spaced apart from the adjacent curved portions of the distal region of catheter 112 by distance D, e.g., 0.4 to 0.6 cm, preferably 0.5 cm. Accordingly, afterloader 200 may deliver two or more radioactive source positions within catheter 112 such that two or more radioactive source positions may selectively be at least distance D apart from each other during operation of applicator 100 for effective radiotherapy of the treatment site.

Figure 4A:
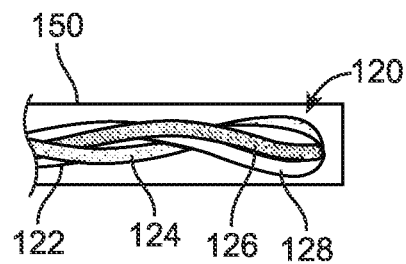
FIG. 4A is a side view of another alternative exemplary applicator having four catheters in a uncoiled delivery state within a sheath.
Figure 4B:
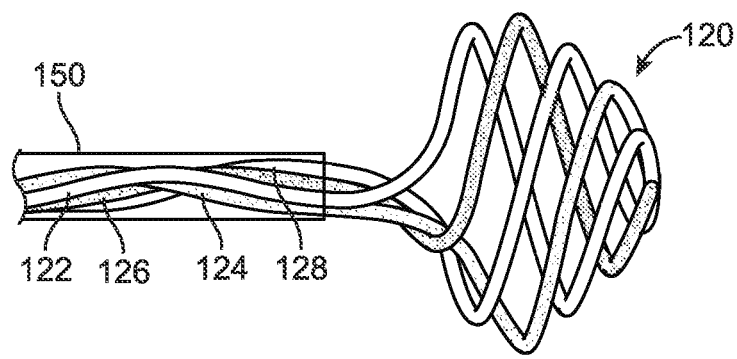
FIG. 4B is a side view of the applicator of FIG. 4A with the catheters partially exposed from the sheath.
Figure 4C:
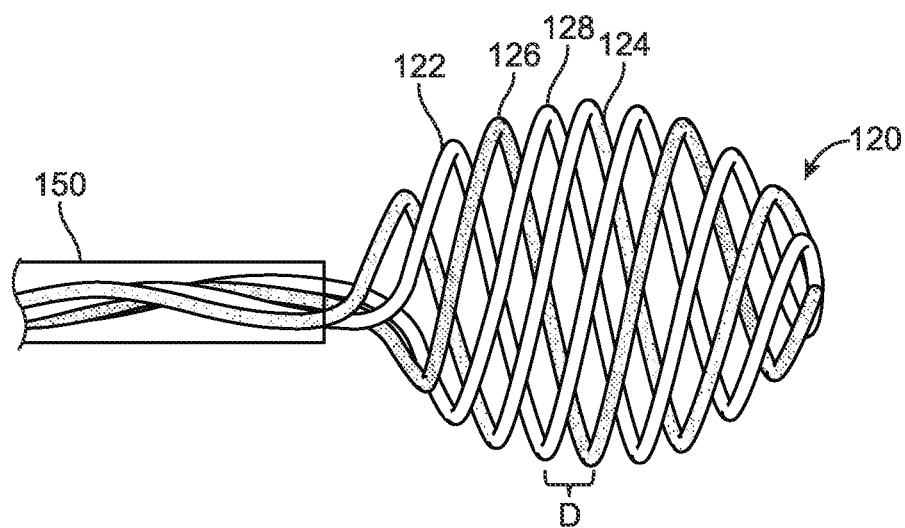
FIG. 4C is a side view of the applicator of FIG. 4B with the catheters in an expanded delivery state.

Referring now to FIGS. 4A-4C, an alternative exemplary applicator is provided. Applicator 120 is constructed similar to applicator 100 of FIGS. 2A-2C except that applicator 120 includes four catheters 122, 124, 126, 128. Each of catheters 122, 124, 126, 128 may be individually activated by afterloader 200 to deliver radiation. As shown in FIG. 4A, catheters 122, 124, 126, 128 may be positioned within the lumen of sheath 150 in a collapsed state. In accordance with another aspect of the present disclosure, each of catheters 122, 124, 126, 128 may be positioned within their own respective lumen within sheath 150. Accordingly, the distal end of sheath 150, having the distal regions of catheters 122, 124, 126, 128 disposed therein, may be inserted through the patient's urethra and into the patient's bladder.

As illustrated in FIG. 4B, as catheters 122, 124, 126, 128 move relative to sheath 150 such that the distal portions of catheters 122, 124, 126, 128 are exposed beyond the distal end of sheath 150, catheters 122, 124, 126, 128 transition from the uncoiled delivery state to the coiled deployed state within the patient's bladder. Moreover, catheters 122, 124, 126, 128 may expand to conform to the shape of the anatomical structure.

Like catheters 102, 104, as catheters 122, 124, 126, 128 transition from the uncoiled delivery state to the coiled deployed state, the distal regions of catheters 122, 124, 126, 128 expand to a spiral, spherical shape. For example, catheters 122, 124, 126, 128 may have a spiral configuration such that a curved portion of the distal region of catheter 122 is positioned adjacent to a curved portion of the distal region of catheter 124, which is also positioned adjacent to a curved portion of the distal region of catheter 126, which is positioned adjacent to a curved portion of the distal region of catheter 128, in a continuous pattern in the coiled deployed state. In accordance with one aspect of the present disclosure, the distal ends of the distal portions of catheters 122, 124, 126, 128 may be fixed together to facilitate stability of applicator 120 during the transition between the uncoiled delivery state and the coiled deployed state.

FIG. 4C illustrates the distal region of applicator 120 in its full expanded spherical configuration, wherein each of the curved portions of the distal regions of catheters 122, 124, 126, 128 may contact a portion of the patient's bladder. Each of the curved portions of the distal regions of catheters 122, 124, 126, 128 are spaced apart from the adjacent curved portion of the distal regions of catheters 122, 124, 126, 128 by distance D, e.g., 0.4 to 0.6 cm, preferably 0.5 cm. Thus, as the curved portions of the distal regions of catheters 122, 124, 126, 128 alternate from the proximal end of the distal regions of catheter 122, 124, 126, 128 to the distal end of the distal region of catheters 122, 124, 126, 128, adjacent curved portions of catheter 122 will be at least 1.6-2.4 cm apart, preferably 2 cm apart (a first curved portion of the distal region of catheter 122 will be adjacent a first curved portion of the distal region of catheter 124 a distance of preferably 0.5 cm, which will be adjacent a first curved portion of the distal region of catheter 126 a distance of preferably 0.5 cm, which will be adjacent a first curved portion of the distal region of catheter 128 a distance of preferably 0.5 cm, which will be adjacent a second curved portion of the distal region of catheter 122 a distance of preferably 0.5 cm, and thus the first and second curved portions of the distal region of catheter 122 will be preferably 2 cm apart). Similarly, adjacent curved portions of catheter 124 will be at least 1.6-2.4 cm apart, preferably 2 cm apart, adjacent curved portions of catheter 126 will be at least 1.6-2.4 cm apart, preferably 2 cm apart, and adjacent curved portions of catheter 128 will be at least 1.6-2.4 cm apart, preferably 2 cm apart. Moreover, afterloader 200 may deliver a first radioactive source within catheter 122, a second radioactive source within catheter 124, a third radioactive source within catheter 126, and/or a fourth radioactive source within catheter 128 such that the first, second, third, and/or fourth radioactive sources will at least distance D apart from each other at all times during operation of applicator 120 for effective radiotherapy of the treatment site.

As will be understood by a person having ordinary skill in the art, the applicators described herein may include any number of catheters other than one, two, or four catheters, as described above. For example, the applicator may include three catheters, five catheters, or more. The number of catheters that an applicator has may be selected based on the target cavity receiving the therapy(ies) described herein. In addition, each of the catheters of the applicator may have different preselected diameters, and each may be made from different materials, depending on the therapy provided.

Figure 5:
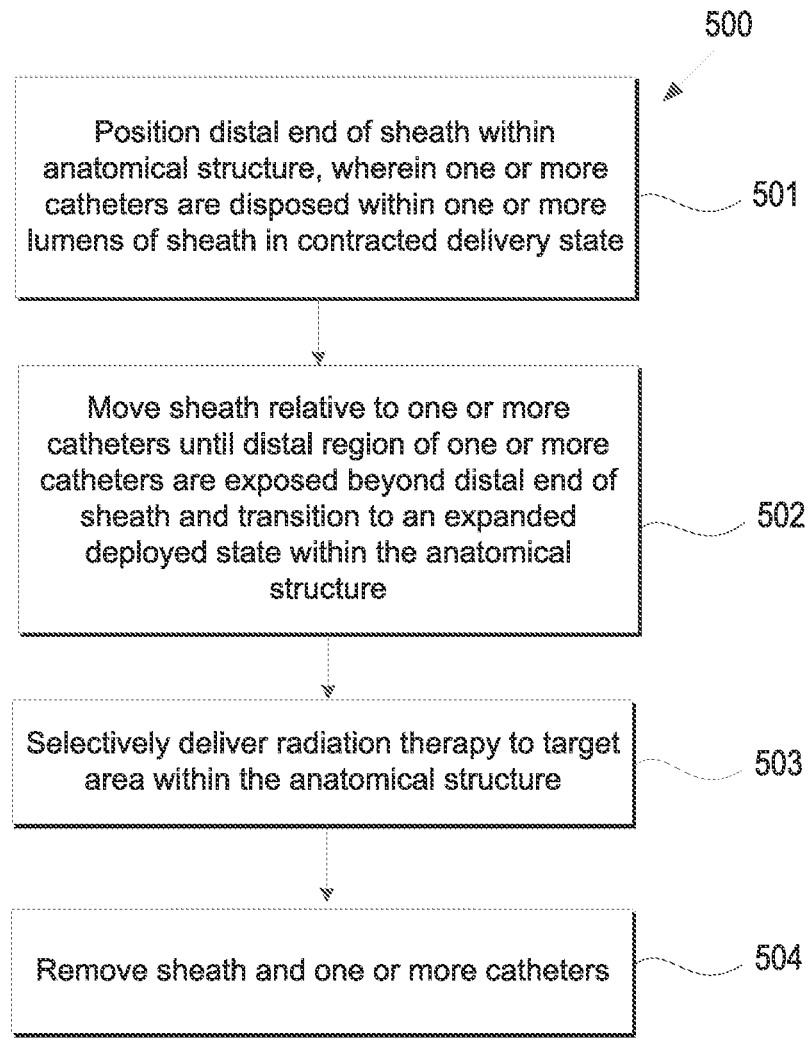
FIG. 5 is a flow chart of exemplary method steps for delivering radiation therapy in accordance with the principles of the present disclosure.

Referring now to FIG. 5, exemplary method 500 for delivering radiation therapy in accordance with the principles of the present disclosure is provided. At step 501, as described above, the distal end of sheath 150 may be positioned within the patient's anatomical structure, e.g., the patient's bladder, via an intracavitary approach through the patient's urethra. The one or more catheters, e.g., catheter 102, 104, 112, 122, 124, 126, 128, of the selected applicator, e.g., applicator 100, 110, or 120, are disposed within one or more lumens of sheath 150. The distal end of sheath 150 need not be positioned directly adjacent the target tumor cells prior to operation of system 10.

At step 502, sheath 150 moves relative to the selected applicator disposed therein, e.g., via retraction of sheath 150 or pushing of the selected applicator within the one or more lumens of sheath 150, until the distal region of the selected applicator is exposed beyond the distal end of sheath 150 within the patient's anatomical structure. As the distal region of the one or more catheters of the selected applicator is exposed beyond the distal end of sheath 150, the distal region of the one or more catheters begin to transition from the uncoiled delivery stated to the coiled deployed state until fully expanded within the anatomical structure.

At step 503, afterloader 200 may selectively deliver radiation therapy to the target treatment site within the anatomical structure via one or more radioactive sources within the lumen(s) of one or more catheters of the selected applicator. When the radiotherapy is complete, the one or more catheters may be transitioned back to the uncoiled delivery state within the one or more lumens of sheath 150, and sheath 150 along with the one or more catheters of the selected applicator may be removed from the patient (step 504).

Figure 6:
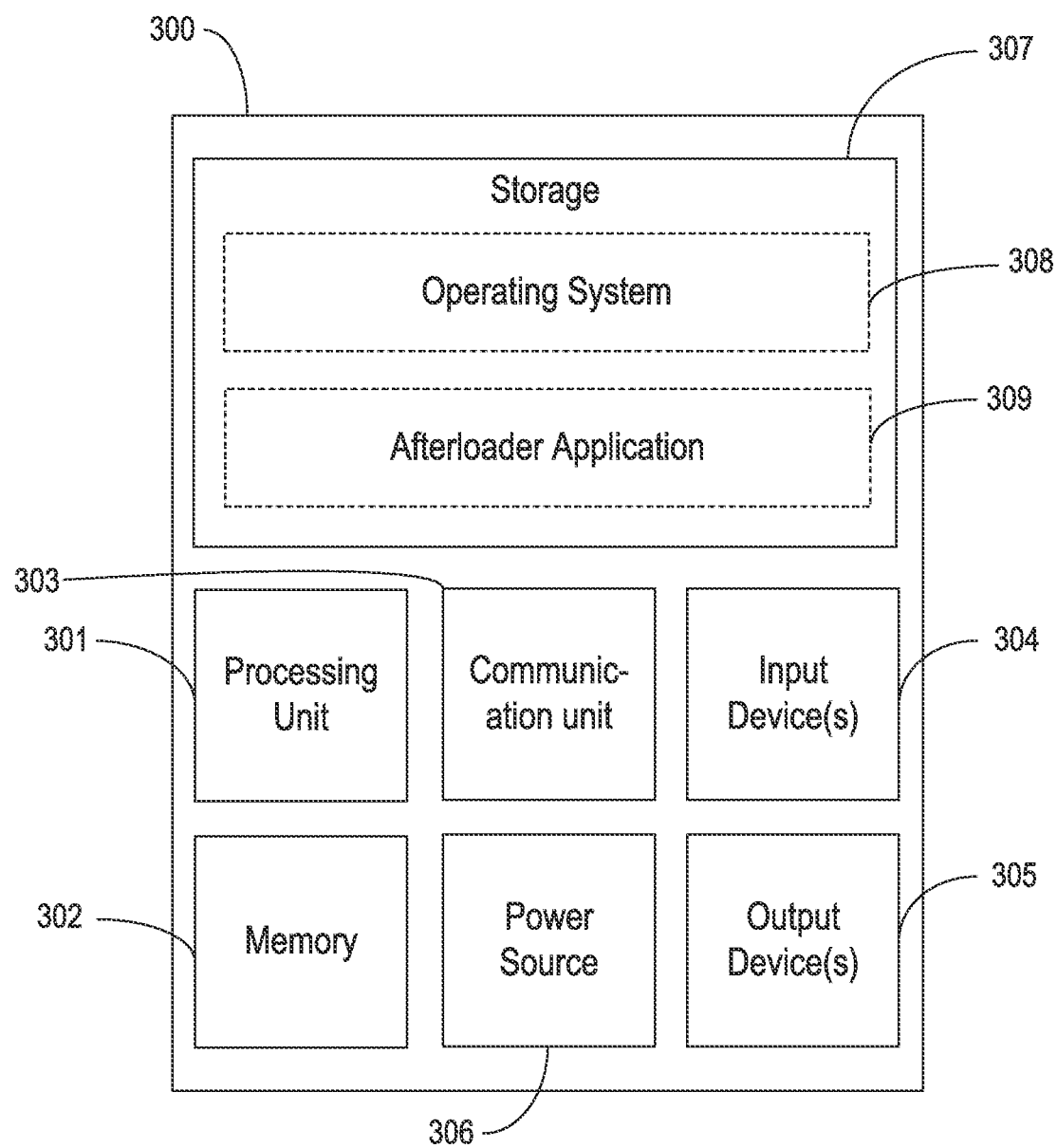
FIG. 6 is a schematic view of exemplary electronic and hardware components of the computing device.

Referring now to FIG. 6, exemplary functional blocks representing the hardware and software components of computing device 300 are shown. Hardware and software components of computing device 300 may include one or more processing unit 301, memory 302, storage 307, communication unit 303, and power source 306, input devices 304, and output devices 305. Computing device 300 may be in communication with the internet and/or other computing devices.

Processing unit 301 may be one or more processors configured to run operating system 308 and/or afterloader application 309. Afterloader application 309 running on processing unit 301 may control the operation of afterloader 200 and may otherwise implement oversee the operations and actions of afterloader 200. Afterloader application 309 may be stored in storage 307 and executed on processing unit 301. Afterloader application 309 may be a software application and/or software modules having one or more sets of instructions suitable for performing the operations of control computing device 300 set forth herein.

Computing device 300 may optionally run operating system 308 stored in storage 307 and executed on processing unit 301. Operating system 308 may be suitable for controlling the general operation of computing device 300 and may work together with afterloader application 309 to achieve the functionality of computing device 300 described herein. Computing device 305 may also optionally run a graphics library, other operating systems, and/or any other application programs.

Memory 302 may include, but is not limited to, volatile (e.g. random-access memory (RAM)), non-volatile (e.g. read-only memory (ROM)), flash memory, or any combination thereof. Communication unit 303 may receive and/or transmit information to and from other computing devices and/or peripheral devices. Communication unit 303 may be any well-known communication infrastructure facilitating communication over any well-known wired or wireless connection, including over any well-known standard such as any IEEE 802 standard. Power source 306 may be a battery or any other external source of power. Storage 307 may include, but is not limited to, removable and/or non-removable storage such as, for example, magnetic disks, optical disks, or tape.

Input device 304 may be one or more devices coupled to or incorporated into control device 300 for inputting data to control device 300. Input device 304 may include a keyboard, a mouse, a pen, a sound input device (e.g., microphone), a touch input device (e.g., touch pad or touch screen), and/or a camera, for example. Output device 305 may be any device coupled to or incorporated into computing device 300 for outputting or otherwise displaying data (e.g., display, speakers, printer, etc.). As will be understood by a person having ordinary skill in the art, computing device 300 may include additional or fewer components than those illustrated in FIG. 6 and may include more than one of each type of component.

Figure 7:
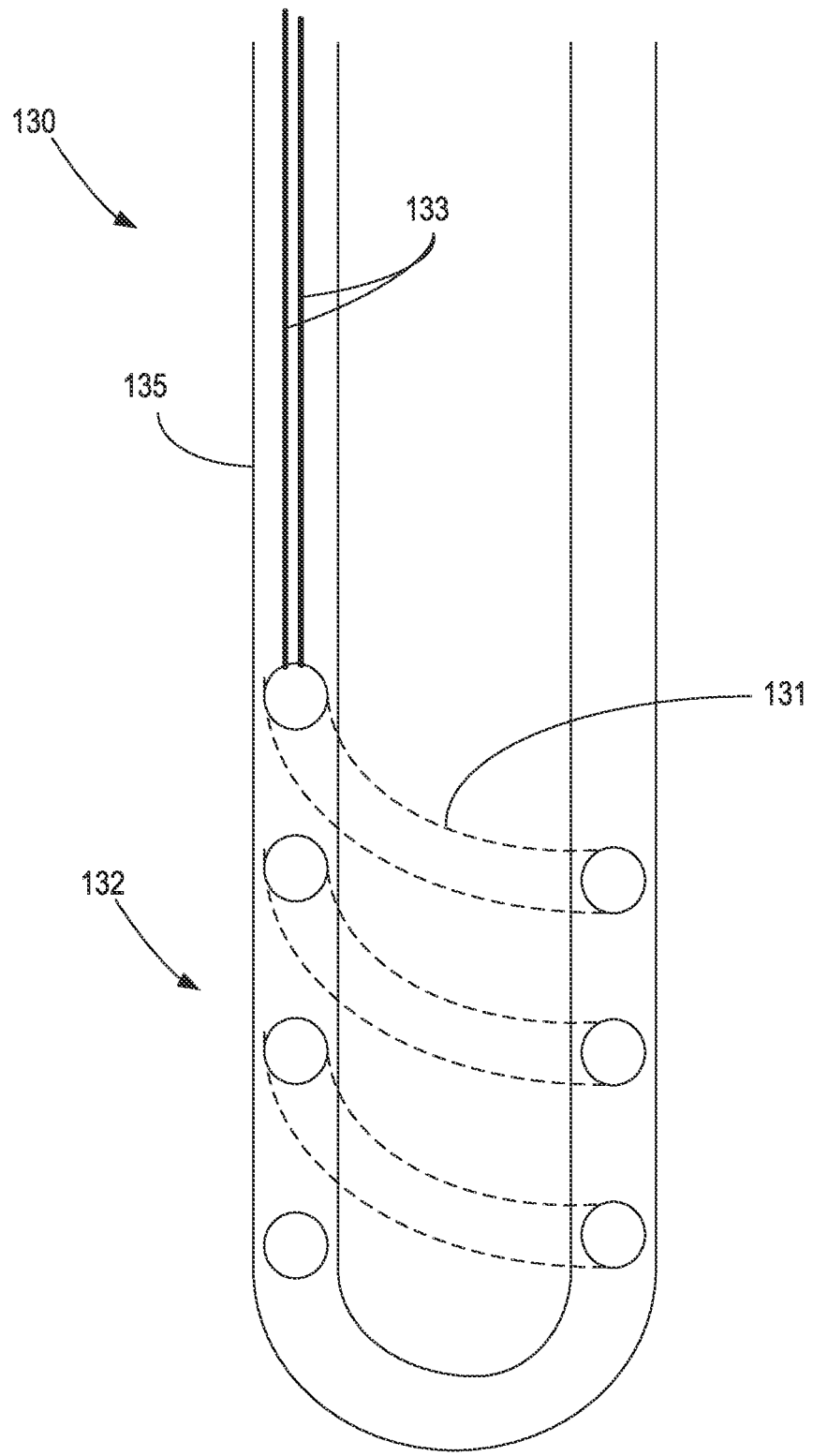
FIG. 7 is a cutaway view of an exemplary catheter with a heater.

Referring now to FIG. 7, an optional hyperthermia applicator is illustrated. As combining radiotherapy with hyperthermia has been observed to increase cancer cell kill and curability rates, it may be desirable to combine a traditional radiotherapy applicator with a hyperthermia catheter. For example, hyperthermia applicator 130 may have similar functionality and structure as applicators 100, 110, 120, but may further include heater 131 along at least a portion of applicator 130. As is shown in FIG. 7, heater 131 may be positioned in walls 135 of distal end 132 of applicator 130 such that heat is applied to the targeted tissue of the patient when distal end 132 of applicator 130 is near the targeted tissue. Heater 131 may be electrically insulated from applicator 130.

Heater 131 may be connected via circuitry 133 to a power source (not shown) which may be in electrical communication with computing device 300. Computing device 300, may run afterloader application 309 or a standalone application to selectively activate heater 131 to heat the targeted tissue. Circuitry may be connected to an independent power source or may use a power source integrated into afterloader 200. The healthcare professional using computing device 300 may select all catheters or only select certain catheters for applying heat. Alternatively, afterload loader application 309 may automatically apply power to certain catheters based on data received from sensors and/or according to programmed instructions.

While FIG. 7 illustrates applicator 130 having a heating coil, it is understood that heater 131 may employ any other well-known heating technique. For example, heater 131 may be a radio frequency (RF) electrode. Alternatively, heater 131 may be one or more fluid channels within walls 135 of applicator 130 and heated fluid may be introduced to the one or more fluid channels to apply heat to the targeted tissue.

Figure 8A:
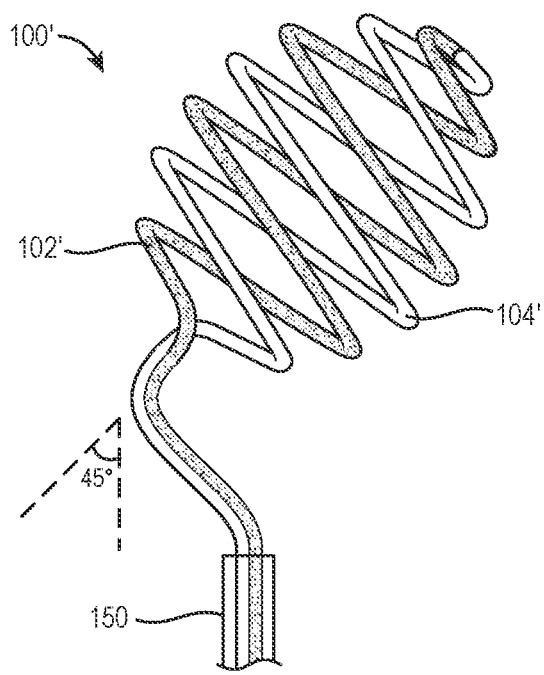
FIGS. 8A-8D illustrate alternative embodiments of the applicator having two catheters constructed in accordance with the principles of the present disclosure.

Referring now to FIGS. 8A to 8D, exemplary applicators having two catheters are provided. Applicators 100', 100", 100''', 100'''' may be constructed similar to applicator 100 of FIGS. 2A-2C, except that in the expanded, deployed state, the distal ends of the respective catheters exit sheath 150 and begin to form the spiral, spherical shape at a predetermined angle relative to the longitudinal axis of the respective applicator and sheath 150. For example, as shown in FIG. 8A, in the expanded, deployed state, the distal ends of catheters 102', 104' of applicator 100' exit sheath 150 and begin to form the spiral, spherical shape at an angle of 45 degrees from the longitudinal axis of applicator 100' and sheath 150.

Figure 8B:
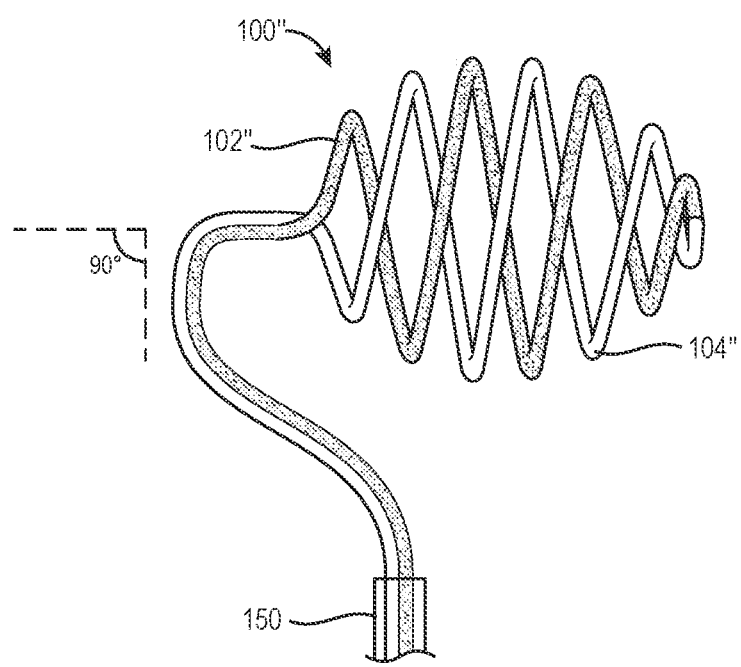
Figure 8C:
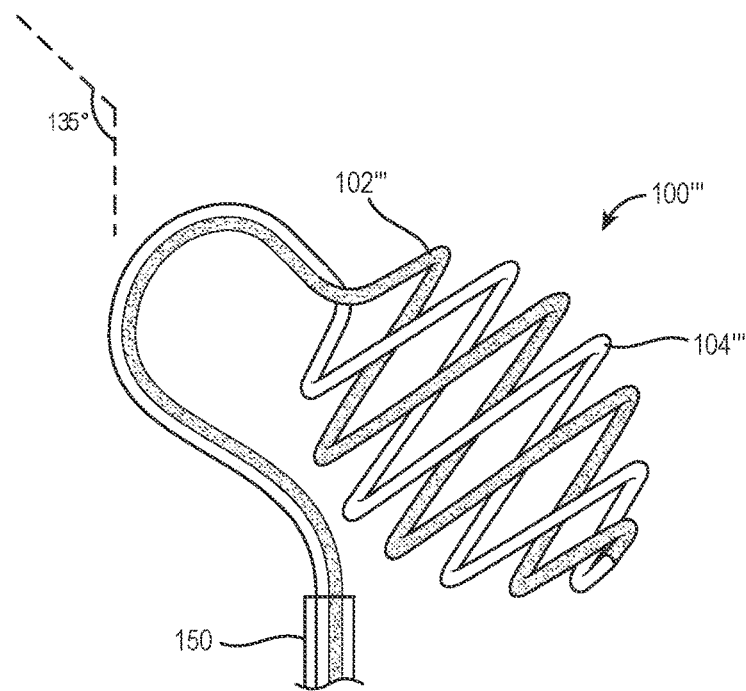
Figure 8D:
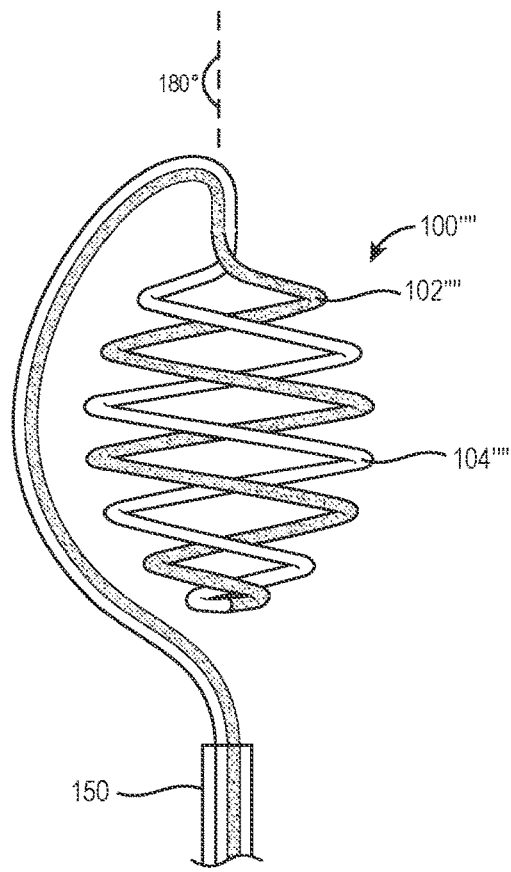

As shown in FIG. 8B, in the expanded, deployed state, the distal ends of catheters 102", 104" of applicator 100" exit sheath 150 and begin to form the spiral, spherical shape at an angle of 90 degrees from the longitudinal axis of applicator 100" and sheath 150. As shown in FIG. 8C, in the expanded, deployed state, the distal ends of catheters 102''', 104''' of applicator 100''' exit sheath 150 and begin to form the spiral, spherical shape at an angle of 135 degrees from the longitudinal axis of applicator 100''' and sheath 150. As shown in FIG. 8D, in the expanded, deployed state, the distal ends of catheters 102'''', 104'''' of applicator 100'''' exit sheath 150 and begin to form the spiral, spherical shape at an angle of 180 degrees from the longitudinal axis of applicator 100'''' and sheath 150.

Figure 9A:
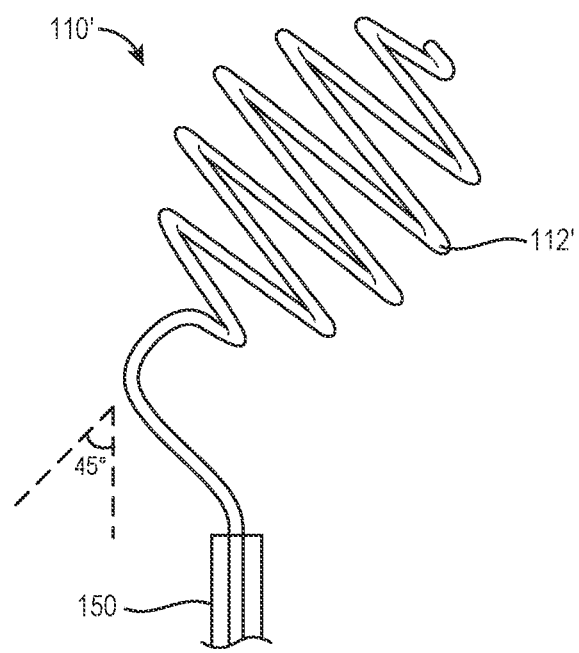
FIGS. 9A-9D illustrate alternative embodiments of the applicator having one catheter constructed in accordance with the principles of the present disclosure.

Referring now to FIGS. 9A to 9D, alternative exemplary applicators having one catheter are provided. Applicators 110', 110", 110''', 110'''' may be constructed similar to applicator 110 of FIGS. 3A-3C, except that in the expanded, deployed state, the distal ends of the respective catheter exit sheath 150 and begin to form the spiral, spherical shape at a predetermined angle relative to the longitudinal axis of the respective applicator and sheath 150. For example, as shown in FIG. 9A, in the expanded, deployed state, the distal end of catheter 112' of applicator 100' exits sheath 150 and begins to form the spiral, spherical shape at an angle of 45 degrees from the longitudinal axis of applicator 110' and sheath 150.

Figure 9B:
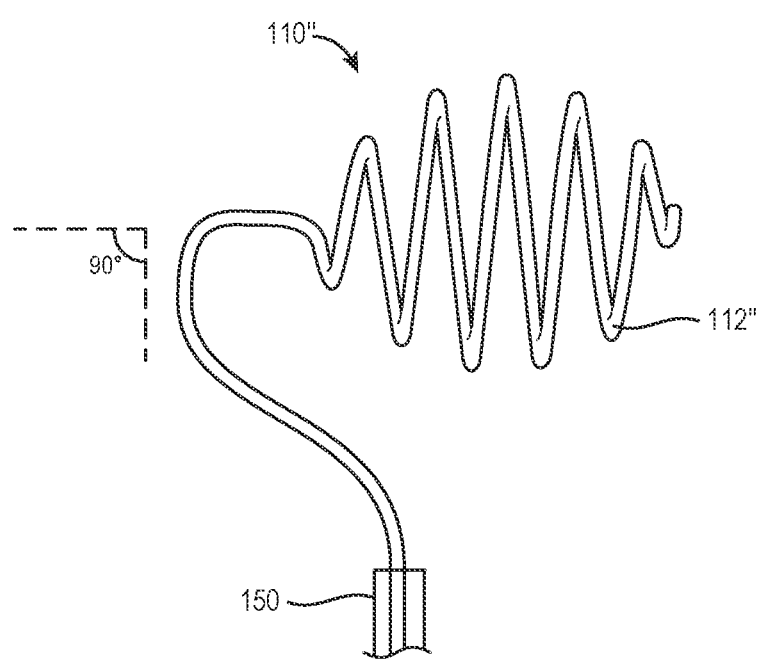
Figure 9C:
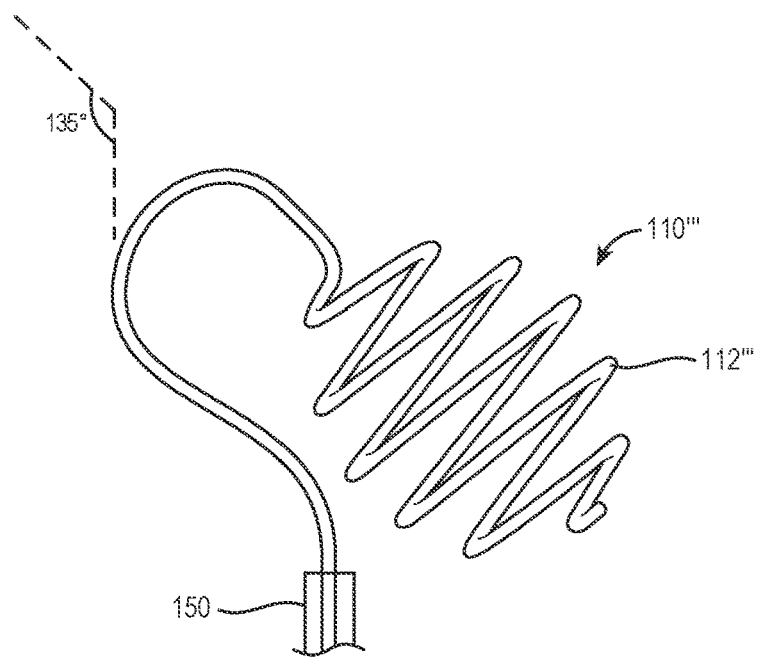
Figure 9D:
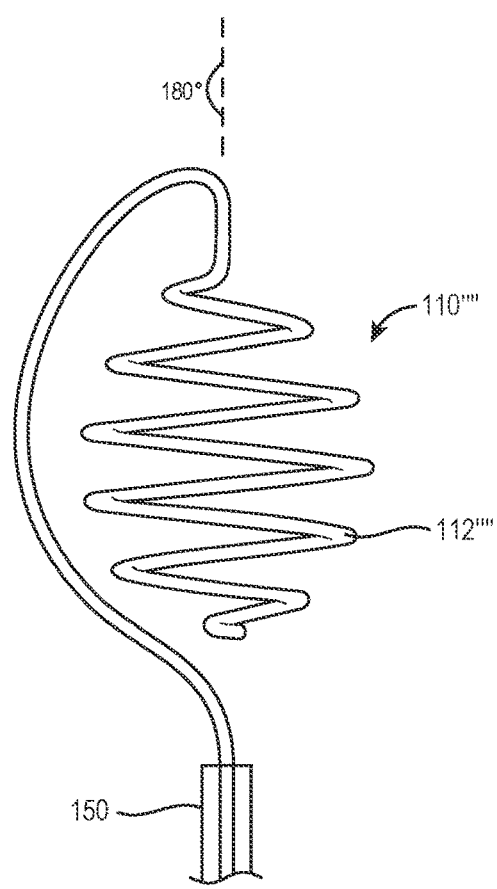

As shown in FIG. 9B, in the expanded, deployed state, the distal end of catheter 112" of applicator 110" exits sheath 150 and begin to form the spiral, spherical shape at an angle of 90 degrees from the longitudinal axis of applicator 110" and sheath 150. As shown in FIG. 9C, in the expanded, deployed state, the distal end of catheter 112''' of applicator 110''' exits sheath 150 and begins to form the spiral, spherical shape at an angle of 135 degrees from the longitudinal axis of applicator 110''' and sheath 150. As shown in FIG. 9D, in the expanded, deployed state, the distal end of catheter 112'''' of applicator 110'''' exits sheath 150 and begins to form the spiral, spherical shape at an angle of 180 degrees from the longitudinal axis of applicator 110'''' and sheath 150.

Figure 10A:
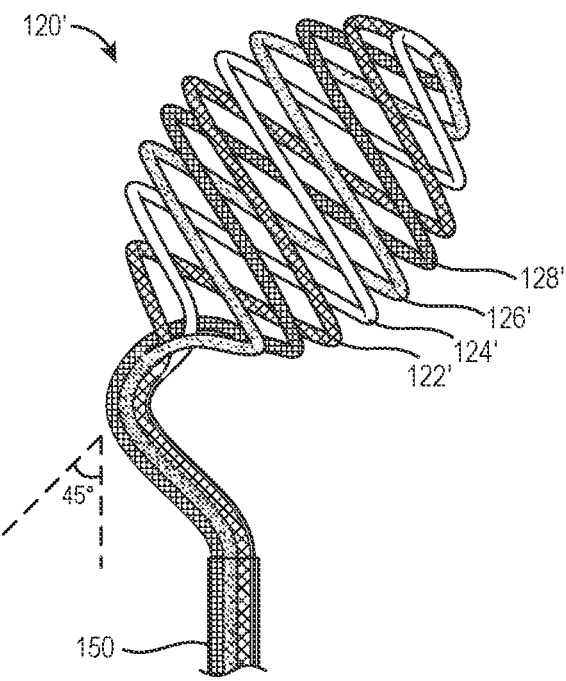
FIGS. 10A-10D illustrate alternative embodiments of the applicator having four catheters constructed in accordance with the principles of the present disclosure.

Referring now to FIGS. 10A to 10D, alternative exemplary applicators having four catheters are provided. Applicators 120', 120'', 120''', 120'''' may be constructed similar to applicator 120 of FIGS. 4A-4C, except that in the expanded, deployed state, the distal ends of the respective catheters exit sheath 150 and begin to form the spiral, spherical shape at a predetermined angle relative to the longitudinal axis of the respective applicator and sheath 150. For example, as shown in FIG. 10A, in the expanded, deployed state, the distal ends of catheters 122', 124', 126', 128' of applicator 120' exit sheath 150 and begin to form the spiral, spherical shape at an angle of 45 degrees from the longitudinal axis of applicator 120' and sheath 150.

Figure 10B:
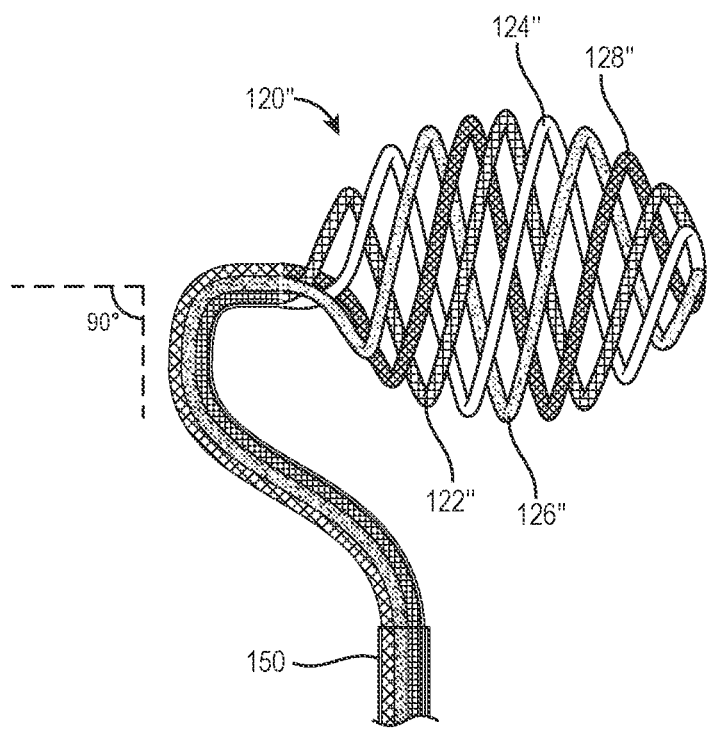
Figure 10C:
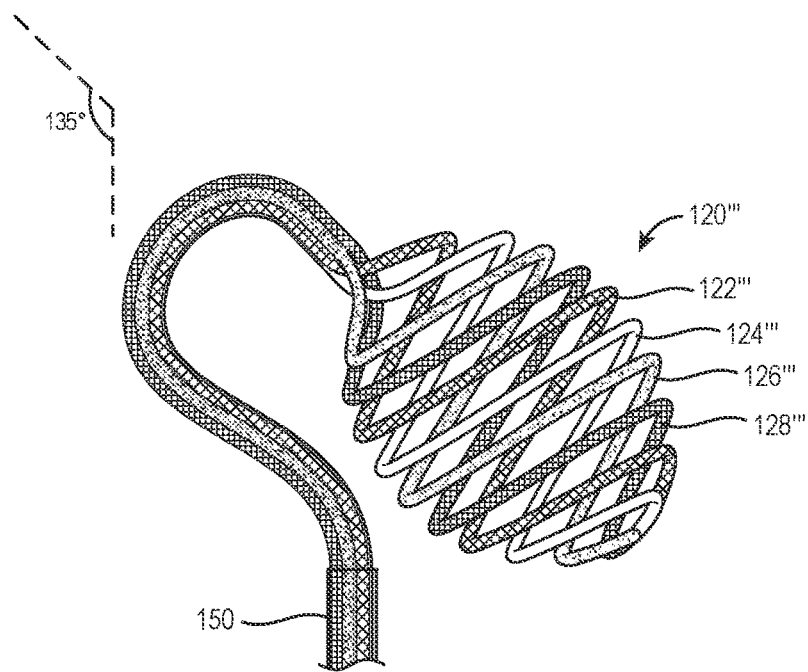
Figure 10D:
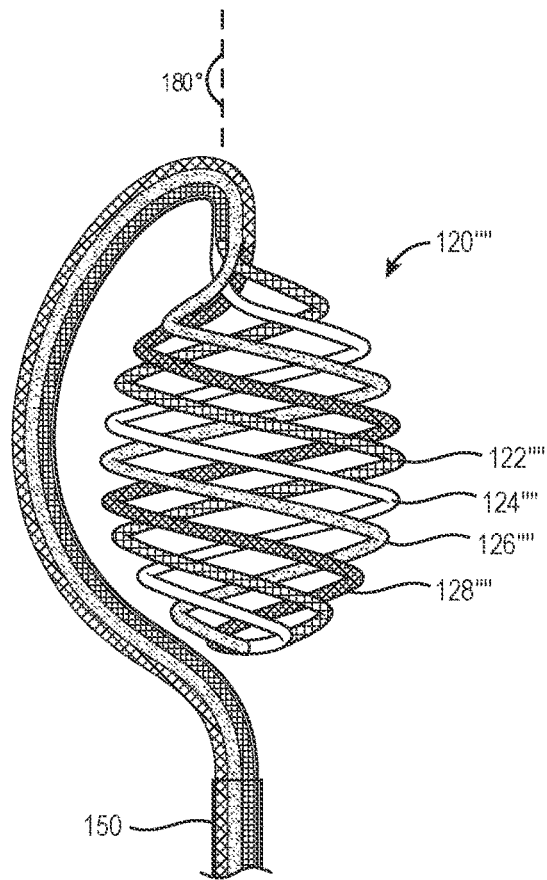

As shown in FIG. 10B, in the expanded, deployed state, the distal ends of catheters 122'', 124'', 126'', 128'' of applicator 100'' exit sheath 150 and begin to form the spiral, spherical shape at an angle of 90 degrees from the longitudinal axis of applicator 120'' and sheath 150. As shown in FIG. 10C, in the expanded, deployed state, the distal ends of catheters 122''', 124''', 126''', 128''' of applicator 120''' exit sheath 150 and begin to form the spiral, spherical shape at an angle of 135 degrees from the longitudinal axis of applicator 120''' and sheath 150. As shown in FIG. 10D, in the expanded, deployed state, the distal ends of catheters 122'''', 124'''', 126'''', 128'''' of applicator 120'''' exit sheath 150 and begin to form the spiral, spherical shape at an angle of 180 degrees from the longitudinal axis of applicator 120'''' and sheath 150.

As described above, as will be understood by a person having ordinary skill in the art, the applicators described herein may include any number of catheters other than one, two, or four catheters, as described above. For example, the applicator may include three catheters, five catheters, or more. Moreover, the catheter(s) exiting sheath 150 may begin to form the spiral spherical shape at any angle relative to the longitudinal axis of the applicator and sheath 150 other than 0, 45, 95, 135, and 180 degrees, as described above. For example, the angle may be 20, 30, 225, 270, etc.

Figure 11:
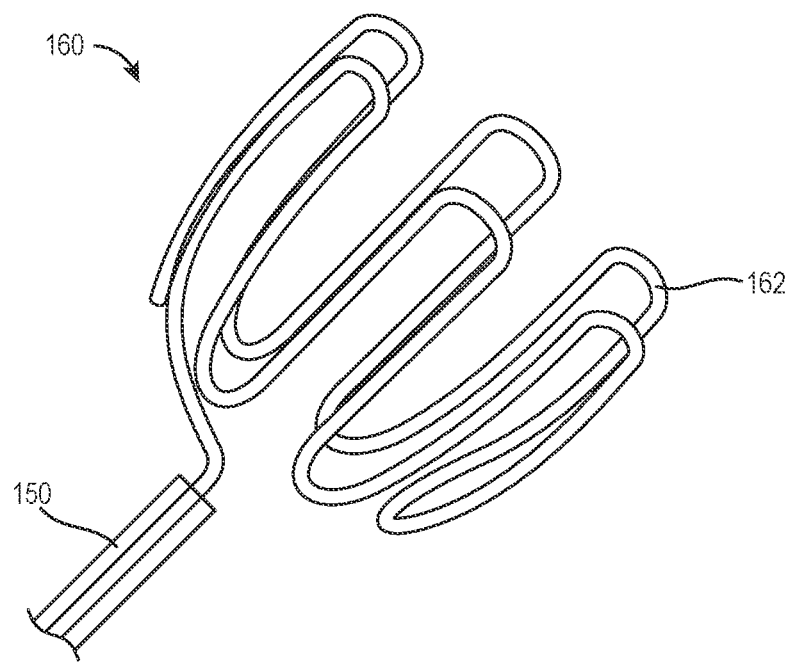
FIG. 11 illustrates another alternative embodiment of the applicator having one catheter constructed in accordance with the principles of the present disclosure.

Referring now to FIG. 11, another alternative exemplary applicator is provided. As shown in FIG. 11, applicator 160 may include catheter 162, which may be activated by afterloader 200 to deliver radiation in accordance with the principles of the present disclosure. Catheter 162 may be delivered to the target treatment site within the patient in a collapsed, delivery state within sheath 150, and self-expand upon exposure from sheath 150. As shown in FIG. 11, in the expanded state, the distal portion of catheter 162 may have a pre-formed, spherical or half dome shape, such that the distal portion of catheter 162 has a plurality of proximal-to-distal extending oscillations that travel circumferentially about the longitudinal axis of applicator 160 and sheath 150. Although FIG. 11 illustrates catheter 162 having six oscillations, as will be understood by a person having ordinary skill in the art, catheter 162 may have less or more than six oscillations about the longitudinal axis of applicator 160 and sheath 150. Moreover, the distal end of applicator 160 may curve radially inward to form a more spherical shape. In addition, although FIG. 11 illustrates applicator 160 having one catheter, applicator 160 may include more than one independently controllable catheter, which together form the spherical shape or half dome shape having a plurality of proximal-to-distal extending oscillations that travel circumferentially about the longitudinal axis of applicator 160 and sheath 150.

Figure 12:
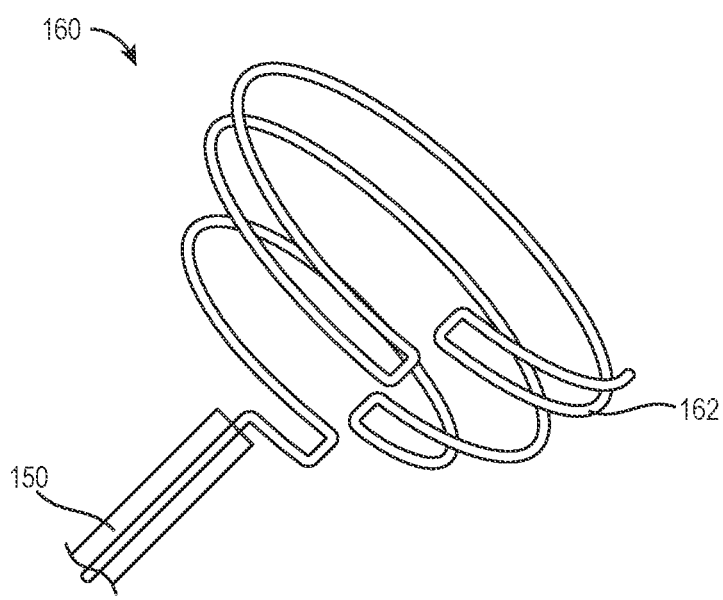
FIG. 12 illustrates yet another alternative embodiment of the applicator having one catheter constructed in accordance with the principles of the present disclosure.

Referring now to FIG. 12, another alternative exemplary applicator is provided. As shown in FIG. 12, applicator 170 may include catheter 172, which may be activated by afterloader 200 to deliver radiation in accordance with the principles of the present disclosure. Catheter 172 may be delivered to the target treatment site within the patient in a collapsed, delivery state within sheath 150, and self-expand upon exposure from sheath 150. As shown in FIG. 12, in the expanded state, the distal portion of catheter 172 may have a pre-formed, spherical or half dome shape, such that the distal portion of catheter 172 has a plurality of oscillations that extend in a direction perpendicular to the proximal-to-distal direction (as opposed to the oscillations of catheter 162 of FIG. 11 which extend in the proximal/distal direction) that travel from a proximal end of the distal portion of applicator 170 to a distal end of the distal portion of applicator 170 about the longitudinal axis of applicator 160 and sheath 150. For example, the diameter of the plurality of circumferentially extending oscillations of catheter 172 may increase from the proximal end of the distal portion of applicator 170 to the distal end of the distal portion of applicator 170.

Although FIG. 12 illustrates catheter 172 having four oscillations, as will be understood by a person having ordinary skill in the art, catheter 172 may have less or more than four oscillations about the longitudinal axis of applicator 170 and sheath 150. Moreover, the distal end of applicator 170 may curve radially inward to form a more spherical shape. For example, the diameter of the plurality of circumferentially extending oscillations of catheter 172 may increase from the proximal end of the distal portion of applicator 170 toward a midpoint of the distal portion of applicator 170, and then decrease from the midpoint of the distal portion of applicator 170 toward the distal end of the distal portion of applicator 170. In addition, although FIG. 12 illustrates applicator 170 having one catheter, applicator 170 may include more than one independently controllable catheter, which together form the spherical shape or half dome shape having a plurality of circumferentially extending oscillations that travel from the proximal end of the distal portion of applicator 170 to the distal end of the distal portion of applicator 170 about the longitudinal axis of applicator 160 and sheath 150.

While various illustrative embodiments of the invention are described above, it will be apparent to one skilled in the art that various changes and modifications may be made herein without departing from the invention. It will further be appreciated that the systems and methods described herein may be utilized for delivering radiotherapy in an organ other than the bladder, and may be utilized as part of other therapies including, for example, heat therapy, cryotherapy, laser therapy, ultrasound therapy, radiofrequency ablation (RFA) therapy, microwave therapy, electroporation therapy, topical medication therapy, and medication injection therapy. The appended claims are intended to cover all such changes and modifications that fall within the true spirit and scope of the invention.

What is claimed is:

1. A system to treat a patient, the system comprising:
   a sheath having a proximal end, a distal end, and a lumen extending therebetween; and
   an applicator moveable within the lumen of the sheath and comprising a first catheter with a closed distal end and a second catheter with a closed a distal end, wherein the distal end of the first catheter and the distal end of the second catheter are directly joined end-to-end to one another but do not form a continuous lumen therebetween so that the distal end of the first catheter touches the distal end of the second catheter without an intervening device or component therebetween, a distal portion of the applicator being configured to transition from an uncoiled delivery state to a coiled deployed state within an anatomical structure of the patient, wherein in the coiled deployed state the first catheter has a first spiral shape and the second catheter has a second spiral shape.

2. The system of claim 1, wherein at least the distal portion of the first and second catheters is made of a shape memory material.

3. The system of claim 1, wherein at least the distal portion of at least one of the first catheter and the second catheter is flexible.

4. The system of claim 1, wherein the distal portion of the applicator is configured to transition from the uncoiled delivery state to the coiled deployed state when exposed beyond the distal end of the sheath.

5. The system of claim 1, wherein when the first and second catheters are in the coiled deployed state, the first and second catheters each extend from a proximal end of the distal portion, curve about a longitudinal axis of the distal portion while a radial distance between the first and second catheters and the longitudinal axis increases until reaching a midpoint of the distal portion, extend from the midpoint of the distal portion, and curve about the longitudinal axis of the distal portion while the radial distance between the first and second catheters and the longitudinal axis decreases until reaching a distal end of the distal portion.

6. The system of claim 1, wherein, in the coiled deployed state, a curved portion of the distal portion of the first catheter is 0.4 cm-0.6 cm from an adjacent curved portion of the distal portion of the second catheter.

7. The system of claim 1, wherein the distal portion of the applicator is configured to transition to the coiled deployed state within at least one organ of the patient and interior cavity within the patient.

8. The system of claim 7, wherein, in the coiled deployed state, at least a portion of at least one of the first catheter and the second catheter is configured to contact at least one of an inner wall of an organ of the patient and an interior of a cavity within the patient.

9. The system of claim 1, wherein at least one of the first catheter and the second catheter comprises a hyperthermia delivery catheter configured to apply heat to the anatomical structure of the patient.

10. The system of claim 1, further comprising:
a radiation source configured to be movable to a position along the distal portion of at least one of the first catheter and the second catheter while the applicator is in the coiled deployed state.

11. A method of treating a patient, the method comprising:
positioning a distal end of a sheath comprising at least one lumen within an anatomical structure of a patient;
positioning an applicator in an uncoiled delivery state within the at least one lumen of the sheath until a distal portion of the applicator is positioned adjacent the distal end of the sheath within the anatomical structure of the patient, the applicator comprising a first catheter with a closed distal end and a second catheter with a closed distal end, wherein the distal end of the first catheter and the distal end of the second catheter are directly joined end-to-end to one another but do not form a continuous lumen therebetween so that the distal end of the first catheter touches the distal end of the second catheter without an intervening device or component therebetween;
moving the sheath relative to the applicator until the distal portion of the applicator is exposed beyond the distal end of the sheath and transitions to a coiled deployed state within the anatomical structure of the patient, wherein in the coiled deployed state the first catheter has a first spiral shape and the second catheter has a second spiral shape; and
delivering radiation therapy to the anatomical structure via moving a radiation source within at least one of the first catheter and the second catheter when the applicator is deployed within the anatomical structure of the patient.

12. The method of claim 11, wherein positioning the distal end of the sheath within the anatomical structure of the patient comprises positioning the distal end of the sheath within at least one of an organ of the patient and an interior cavity within the patient.

13. The method of claim 12, wherein in the coiled deployed state, at least a portion of the distal portion of the applicator contacts an inner surface of the at least one organ of the patient and interior cavity within the patient.

14. The method of claim 11, wherein delivering radiation therapy comprises activating the radiation source to deliver radiation.

15. The method of claim 11, further comprising:
applying, via the applicator, heat to the anatomical structure of the patient while delivering radiation to the anatomical structure of the patient.

16. The method of claim 11, further comprising:
after completion of the radiation therapy, moving the sheath relative to the applicator until the distal portion of the applicator transitions from the coiled deployed state within the anatomical structure of the patient to the uncoiled delivery state within the at least one lumen of the sheath; and
removing the sheath and the applicator from the patient.

17. The method of claim 11, further comprising:
applying, via the applicator, heat sequentially with radiation to the anatomical structure of the patient.

18. A system configured to treat a patient, the system comprising:
a sheath having a proximal end, a distal end, and a lumen extending therebetween;
an applicator moveable within the lumen of the sheath and comprising a first catheter with a closed distal end and a second catheter with a closed distal end, wherein the distal end of the first catheter and the distal end of the second catheter are directly joined end-to-end to one another but do not form a continuous lumen therebetween so that the distal end of the first catheter touches the distal end of the second catheter without an intervening device or component therebetween, a distal portion of the applicator being configured to transition from an uncoiled delivery state to a coiled deployed state within an anatomical structure of the patient, wherein in the coiled deployed state the first catheter has a first spiral shape and the second catheter has a second spiral shape, the applicator being configured to enable delivery of radiation therapy to a target area within the anatomical structure; and
a radiation source configured to be movable to a position along the distal portion of at least one of the first catheter and the second catheter while the applicator is in the coiled deployed state.

19. The system of claim 18, wherein the first catheter is configured to enable delivery of radiation and the second catheter is configured to deliver heat.

\* \* \* \* \*